United States Patent [19]
Murasaki et al.

[11] Patent Number: 4,963,896
[45] Date of Patent: Oct. 16, 1990

[54] RECORDING MEDIA TRANSPORTING DEVICE WITH ARCSHAPED PATH

[75] Inventors: Sadanobu Murasaki; Hajime Takei, both of Osaka, Japan

[73] Assignee: Minolta Camera Kabushiki Kaisha, Osaka, Japan

[21] Appl. No.: 343,355

[22] Filed: Apr. 26, 1989

[30] Foreign Application Priority Data

Apr. 28, 1988 [JP] Japan ............ 63-105697
Apr. 28, 1988 [JP] Japan ............ 63-105698

[51] Int. Cl.[5] ............ G01D 15/28; B65H 9/10; B65H 5/16; B65H 5/36; B65H 5/38

[52] U.S. Cl. ............ 346/134; 346/24; 355/309; 355/310; 271/253; 271/271

[58] Field of Search ............ 346/24, 134, 136; 358/304; 355/309, 310; 271/253, 254, 271

[56] References Cited

U.S. PATENT DOCUMENTS

| | | | |
|---|---|---|---|
| 3,395,610 | 8/1968 | Evans | 355/310 |
| 3,534,380 | 10/1970 | East | 346/134 |
| 4,540,166 | 9/1985 | Massengeil | 271/253 |
| 4,541,710 | 9/1985 | McLeish | 355/310 |
| 4,595,957 | 6/1986 | Holthusen | 358/304 |
| 4,874,161 | 10/1989 | Murasaki | 271/271 |

FOREIGN PATENT DOCUMENTS 63-8144 6/1986 Japan .

*Primary Examiner*—Bruce A. Reynolds
*Assistant Examiner*—Scott A. Rogers
*Attorney, Agent, or Firm*—Burns, Doane, Swecker & Mathis

[57] ABSTRACT

A device for transporting a recording medium to an image forming portion through a arcshaped path with pushing the trailing end of the recording medium by hooks provided at ends of levers which is pivotally mounted at the curvature center of the arcshaped path.

12 Claims, 7 Drawing Sheets

RECORDING MEDIA TRANSPORTING DEVICE WITH ARCSHAPED PATH

BACKGROUND OF THE INVENTION

The present invention relates to a device for transporting recording media to a specific position in the transport portion of an image forming apparatus such as that of laser printers, photocopiers and other printing devices.

In the image forming devices of printers and the like, the recording medium is transported in a transport path contained in the image forming device so as to form a desired image on said recording medium while being transported therein. When a sheet-type recording medium is used, the transport path may be formed using a flat guide member so as to counteract the tendency of the sheet to curl.

However, as rolled recording media is unrolled it is cut to a specified length for image formation within the image forming device, but it has a tendency to rewind after being cut into a sheet due to the effect of its former rolled condition. This tendency is particularly great at the corners of the sheet, with greater curling occurring with longer and wider sheets. Therefore, a flat guide is provided in the sheet transport path to prevent curling and guide the sheet in image formation devices wherein the rolled recording media is cut for the image formation process.

In laser printers, for example, paper coated with a photosensitive agent or photosensitive film may be used as the recording media which are configured so as to form a sheet roll that is loaded into a magazine within the printer. During printer operation, the media are continuously output from the magazine, cut to a specified length by a cutter, and transported to the secondary scanning portion where an image is printed thereon. At low temperatures, the media coated with a photosensitive agent will start to curl regardless of curling tendency related to its rolled configuration prior to cutting. Accordingly, curling cannot be controlled when, after cutting, the recording medium is transported while being partially pressed by a flat guide, rather the degree of curling at the corners of the sheet then becomes more pronounced. When more than one size of recording medium is transported in the same printer, the positioning of the corners of the different sized sheets is different and preventing sheet jamming can be difficult. It is therefore preferred that laser printers and other image forming devices using rolled recording media that are cut and then transported use medium which can be transported in the device without curling.

SUMMARY OF THE INVENTION

Accordingly, an object of the present invention is to provide a sheet transporting device which can reliably transport within the image forming device recording medium that have a tendency to curl after, for example, a roll-type recording material is cut into sheets of specified length for the purpose of having an image formed thereon.

Another object of the present invention is to provide a sheet transporting device which can reliably transport the aforesaid recording medium that tend to curl to a specific position in the transport path.

The present invention accomplishes the aforesaid objects in a sheet transporting device that transports the sheet recording medium to the image forming portion, by forming the transport path with a curved guide panel, and providing hooks at the front end of a pair of push levers mounted to a rotating shaft, said hooks being moveable relative to the aforesaid curved transport path in correspondence with the trailing edge of the sheet inserted in the transport path.

Whereby a recording medium is transported in a transport path formed by a guide panel configured in an arc-like shape. Although the recording medium have a tendency to curl, said curling does not occur due to the curved configuration of the guide panel in the shape of an arc, thus preventing binding or jamming by allowing the recording medium to move smoothly through the transport path. The recording medium are transported in the transport path by means of hooks at the front end of push levers mounted to a rotating shaft.

In a further aspect of the present invention, the transport path in the sheet guide device which transports said sheet to an image forming portion said transport path is formed by a guide panel curved in the shape of a circular arc having a width less than that of the aforesaid transported recording medium. The recording medium guide panel further is arranged so as to have an adjustable width regulating plate provided adjacent to both sides thereof.

Whereby a recording medium is transported in a transport path formed by a guide panel configured as a circular arc. Although the recording media have a tendency to curl, said curling direction agree with the curved configuration of the guide panel in the shape of an arc, thus preventing binding or jamming by allowing the recording media to move smoothly through the transport path. The position of the recording medium in the width direction can be set to a specific position within the transport path by means of said width regulating plate. At such time as width-wise positioning occurs, the stiffness of the recording medium in the width direction is increased due to arc-like curling of the medium induced by the arc-shaped guide panel, and the recording medium is not crushed even when it is pressed in the width direction by the width regulating plate, thereby allowing reliable positioning.

For a better understanding of the invention as well as other objects and further features thereof, reference is made to the following drawings and descriptions:

BRIEF DESCRIPTION OF THE DRAWINGS

In the following description, like parts are designated by like reference numbers throughout the several drawings.

DESCRIPTION OF THE PREFERRED EMBODIMENTS

The preferred embodiments of the present invention are described hereinafter with reference to the accompanying drawings.

Figure 1:
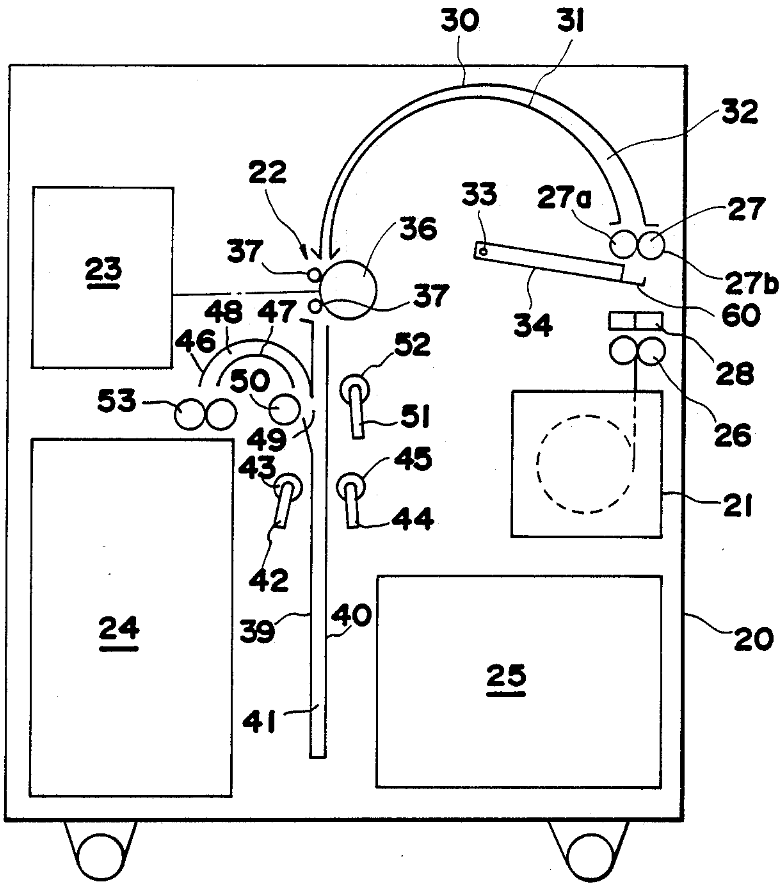
FIG. 1 is a cross section view of a laser printer incorporating an embodiment of the sheet-type recording media transport apparatus of the present invention.

The examples illustrated in the drawings show the sheet guide device of the present invention incorporated in a laser printer, and FIG. 1 shows the complete construction of the laser printer incorporating the guide deice of the invention.

As shown in FIG. 1, a removable magazine 21 is located to the right of center in housing 20 of the laser printer. Roll-type recording media such as photosensitive film or photosensitive paper treated with a surface application of a photosensitive agent is housed within said magazine 21. The recording media are extracted form magazine 21, cut into sheets of specified length, and transported to the secondary scanning portion 22. To the left side of housing 20 is provided an optical unit 23 which forms an image on the transported sheet by exposing it to a laser beam projected by said optical system. Following exposure, the sheet is transported to a developing unit 24 where the image is developed and which is disposed beneath optical unit 23, then the sheet is discharged from printer 20. Operational control of each member incorporated in printer 20 is accomplished by means of a control device in control unit 25 provided within said printer 20.

A pair of take-up rollers 26 are provided above the aforesaid magazine 21 in printer 20 to feed out the rolled recording media from said magazine 21. A pair of transport rollers 27 are provided above said take-up rollers 26 to transport the media fed out by said take-up rollers 26. Take-up rollers 26 and transport rollers 27 have provided therebetween a cutter unit 28 to cut the aforesaid rolled recording media stored in magazine 21 into sheets of specified length.

The pair of transport rollers 26 and the aforesaid secondary scanning porting 22 have disposed therebetween arc-shaped upper transport guide panel 30 and lower transport guide panel 31, said arc-shaped guide panels 30 and 31 forming transport path 32 for guiding the sheet. Thus, the leading edge of the recording media fed form magazine 21 by means of take-up rollers 26 is gripped by transport rollers 27, cut into sheets of specified length by the previously described cutter unit 28, and transported through the transport path 32 to the secondary scanning portion 22. A push lever 34 is fixedly mounted to a rotating shaft 33, such that the end of said push lever 34 links with the trailing edge of the sheet medium.

Secondary scanning portion 22 comprises a single large diameter drum 36 for image formation and two small diameter transport rollers 37 which press against said drum 36. When the recording medium is gripped between drum 36 and rollers 37, a laser beam generated by the aforesaid optical unit 23 exposes the portion of the drum between said rollers 37 and an image if formed thereon. At that time, primary scanning is accomplished by the laser beam from optical unit 23 width-wise to the sheet medium, i.e. perpendicularly to the transport direction, and secondary scanning is accomplished in the transport direction by means of the movement of the sheet medium; an image is formed on the surface of the sheet by means of both the primary and secondary scanning procedures.

Vertical guide panels 39 and 40 are arranged so as to have a specific spacing interposed therebetween in a vertical disposition relative to secondary scanning portion 22, said guide panels 39 and 40 forming therebetween a switchback space 41 for housing the exposed sheet medium. An actuating roller 43 is rotatably mounted to the tip of an oscillating member 42 and a driven roller 45 is rotatably mounted to the tip of driven member 44 to move the medium vertically in the aforesaid switchback space 41. Rollers 43 and 45 are moved to and from by oscillating members 42 and 44 so as to enter and exit said switchback space 41.

Developing unit 24 and guide 39 have interposed therebetween arc-shaped top guide panel 46 and bottom guide panel 47 to transport the sheet medium form the aforesaid switchback space 41 to developing unit 24, said guide panels 46 and 47 being arranged so as to form transport path 48. Transport path 48 communicates with space 41 via communicating aperture 49 formed by guide 39. An actuating roller 50 is provided at the communicating aperture position 49 to transmit the sheet medium from space 41 through transport path 48, and a switchback roller 52 is disposed at the tip of oscillating member 51 opposite actuating roller 50 so as to be capable of applying and releasing pressure thereto. Supply roller set 53 is mounted medially to developing unit 24 and the downstream portion of guide panels 46 and 47.

Figure 2:
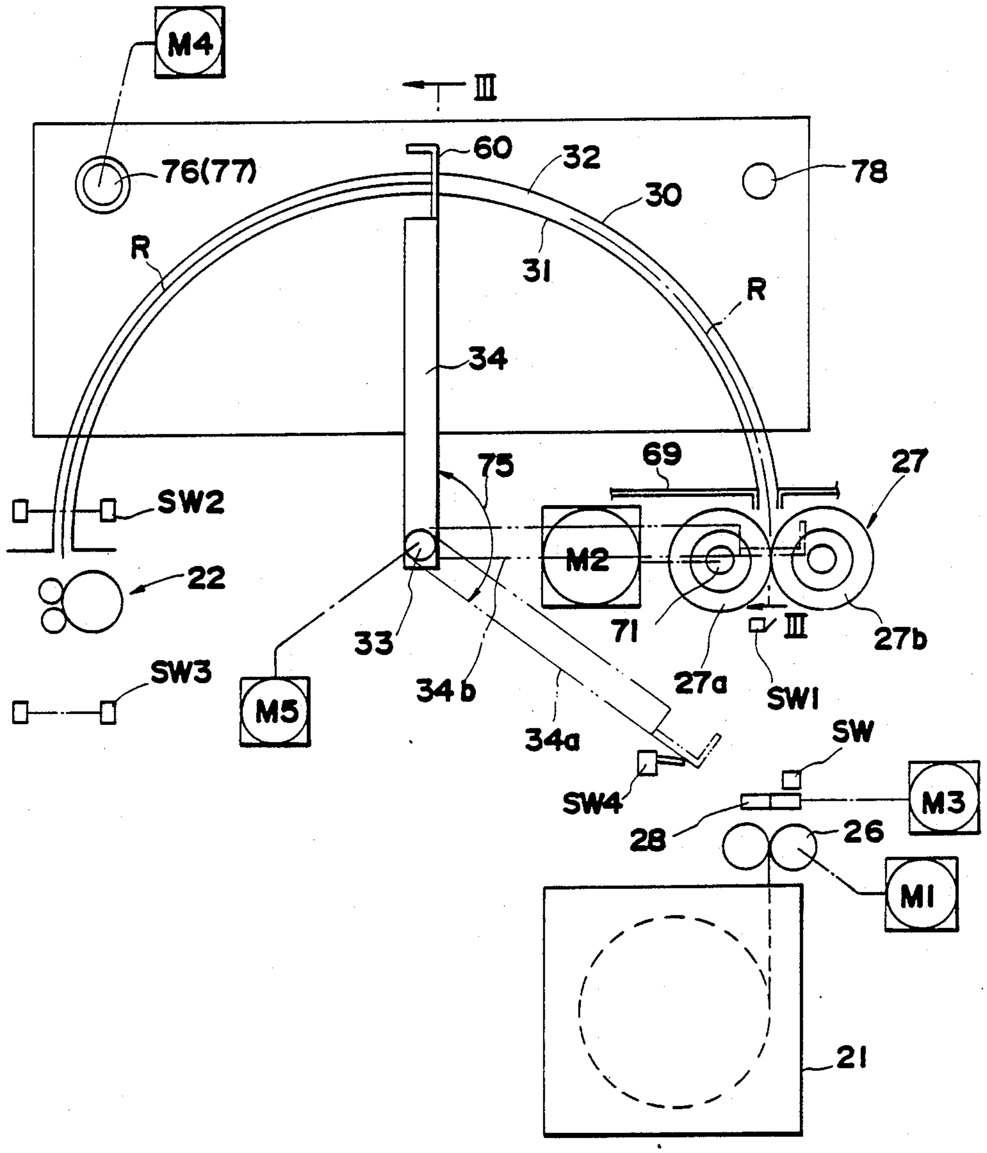
FIG. 2 is an enlarged cross section view of the sheet guide device shown in FIG. 1.
Figure 3:
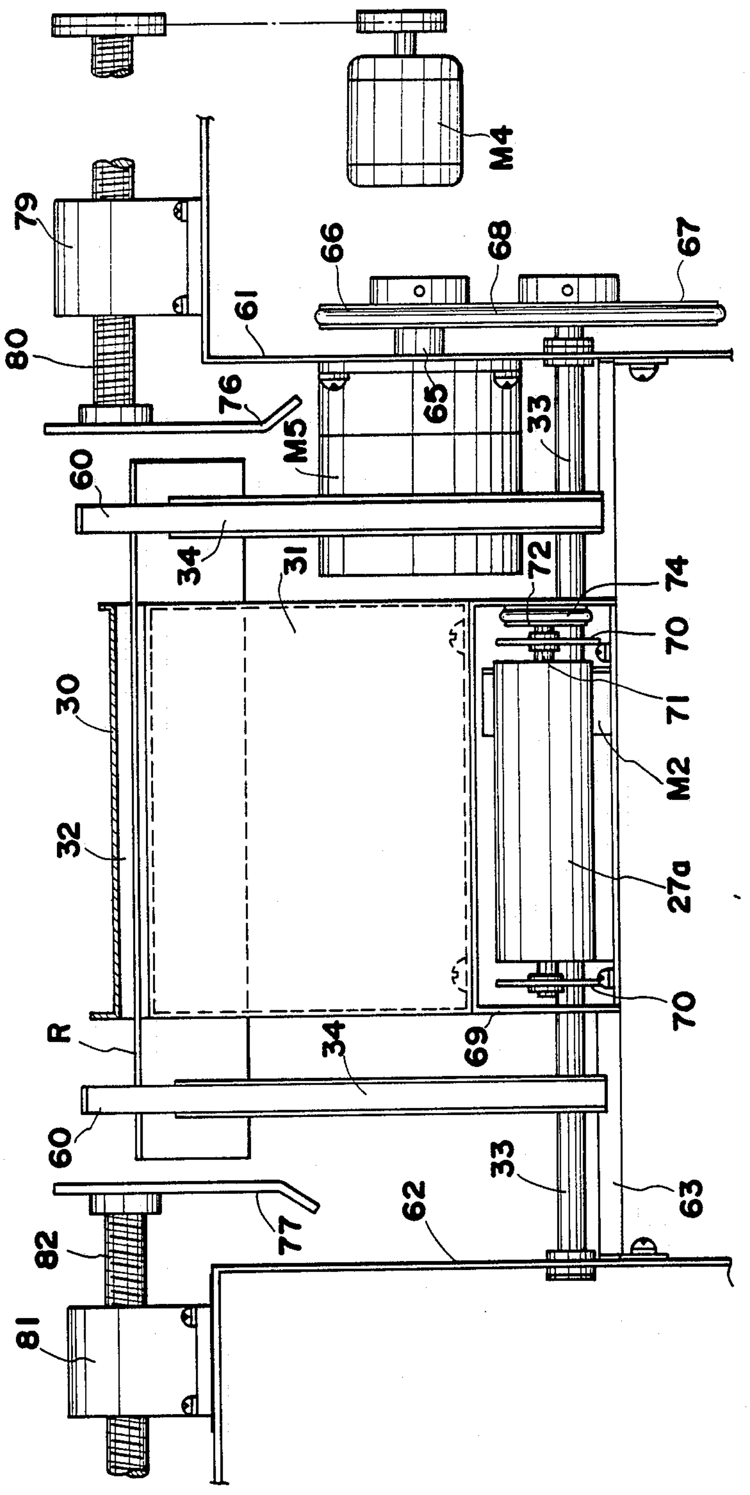
FIG. 3 is a cross section view of LIne III—III shown in FIG. 2.

FIGS. 2 and 3 are enlargements of the region near guide panels 30 and 31 which form transport path 32 shown in FIG. 1.

As shown in FIG. 3, top guide panel 30 and bottom guide panel 31 are arranged so as to have widths less than that of medium R, such that when sheet R transits the transport path 32 between said guide panels 30 and 31 it extends beyond said guide panels 30 and 31 in the width direction on either side. Two push levers 34 are fixedly mounted to rotating shaft 33 and each has a hook 60 attached to the tip thereof, as shown in FIG. 3. Hook 60 is configured as a single piece having a cross sectional L shape at the tip of push lever 34 which is comprises a channel member. Hook 60 is positioned to the outside of guide panels 30 and 31 in the width direction, as shown in FIG. 3.

Both ends of rotating shaft 33 with hook 60 attached thereto is rotatably mounted to frame 61 and 62, said frames 61 and 62 being fixedly attached to base 63 installed in printer 20. Motor M5 which operates rotating shaft 33 is mounted to the inner side of frame 61, pulley 66 attached to the drive shaft of motor M5 and pulley 67 attached to the end of rotating shaft 33 have a belt 68 looped therebetween. Rotating shaft 33 is thus rotated by means of the operation of said motor M5. Motor M5 mounted in position so as to not interfere with push lever 34.

When hook 60 ensnares sheet R, hook 60 rotates from the positions described by the two-dot chain lines in FIG. 2 to the position described by the solid line. Sheet R is thus transported reliably without misalignment because it is ensnared on both sides in the width direction by said hooks 60.

Bottom guide panel 31 is attached to holding frame 69 which is fixedly mounted to base 63. Actuating roller 27*a* of transport roller set 27 is rotatably supported by bracket 70 which is attached to the inside of holding frame 69. A pulley 72 is fixedly attached to support shaft 71 supporting said actuating roller 27*a*, and a belt 74 is looped around said pulley 72 and a pulley fixedly attached to the drive shaft of transport motor M2 installed inside holding frame 69 adjacent to actuating roller 27*a*, as shown in FIG. 2. Accordingly, when actuating roller 27*a* is rotated, driven roller 27*a* also rotates due to the drive force imparted by roller 27*a* and the sheet inserted between said rollers 27*a* and 27*b* is transported into transport path 32 by said roller set 27.

Further, transport roller set 26 is actuated by means of drive motor M1 connected to one of said rollers.

The operation of cutter unit 28 is accomplished by cutter drive motor M3 connected to said cutter.

Two width regulating plates 76 and 77 are movably supported by guide rod 78 so as to allow adjustment to expand and contract in the width direction of guide panels 30 and 31. After the rolled recording media is cut into sheets, width regulating plates 76 and 77 determine the specific positioning of sheet R in the width direction when said sheet is transported in transport path 32 by push lever 34.

The tip of feed screw 80 which is supported by support nut 79 is connected to width regulating plate 76, said feed screw 80 being actuated by width regulating plate drive motor M4 which is connected thereto, and the tip of feed screw 82 which is supported by support nut 81 is connected to width regulating plate 77, said feed screw 82 being connected to the aforesaid feed screw 80 by a linkage not shown in the drawings so as to rotate synchronously with said feed screw 80. When feed screw 80 is rotated by width regulating plate drive motor M4, feed screw 80 is screwed into support nut 79 via a screw linkage thereby advancing width regulating plate 76 to the side edge of sheet R. Feed screw 82 is simultaneously advanced on the opposite side so that sheet R is positioned at a specified position in transport path 32 by means of the two width regulating plates 76 and 77. To enable feed screws 80 and 82 to be rotated in the same direction so as to mutually advance and retract in the axial direction, feed screw 8 has a righthand thread and feed screw 82 has a lefthand thread. This thread arrangement may be reversed.

Further, the aforesaid arrangement may be configured as a single feed screw with support nuts mounted to width regulating plates 76 and 77 such that said support nuts have a screw threaded linkage with the single feed screw. In such an instance, the screw thread linkage of the support nut on one side will be configured so as to have a right or lefthand thread and the screw thread linkage of the other support nut will have the opposite threading. Thus, the sheet medium is curled and positioned by the width regulating plates because positioning of said sheet in the width direction in the transport path is accomplished by arranging the reciprocally adjustable width regulating plates opposite the sides of the guide panels adjacent to the sides of both said guide panels. The stiffness of the sheet in the width direction is thereby enhanced and the sheet is reliably positioned without misalignment.

As shown in FIGS. 2 and 3, push lever drive motor M5 is connected to rotating shaft 33 to rotate push lever 34. Push lever 34 is rotated by motor M5 as indicated by arrow 75 from the starting position described by two-dot chain line 34*a* through the hooking position described by two-dot chain line 34*b* to the terminal position described by the solid line.

A sensor SW1 is provided near transport rollers 27 to detect the trailing edge of sheet R after the leading edge of said sheet has passed said position. Downstream in transport path 32 is provided a sensor SW2 to detect the arrival of the leading edge of sheet R, which is advanced through transport path 32 by means of push lever 34, at the fore portion of the secondary scanning portion 22. A sensor SW3 is also provided beneath the secondary scanning portion 22 to detect start of the exposure period, and a sensor SW4 is provided above magazine 21 to detect the starting position of push lever 34. The aforesaid sensors SW1 through SW 4 comprise members for generating ultrasonic waves and ultrasonic wave sensors with receptors. A cutter initial switch SW is provided at the cutter unit to detect the starting position of the cutter. Switch SW comprised, for example, a limit switch or the like.

Figure 4:
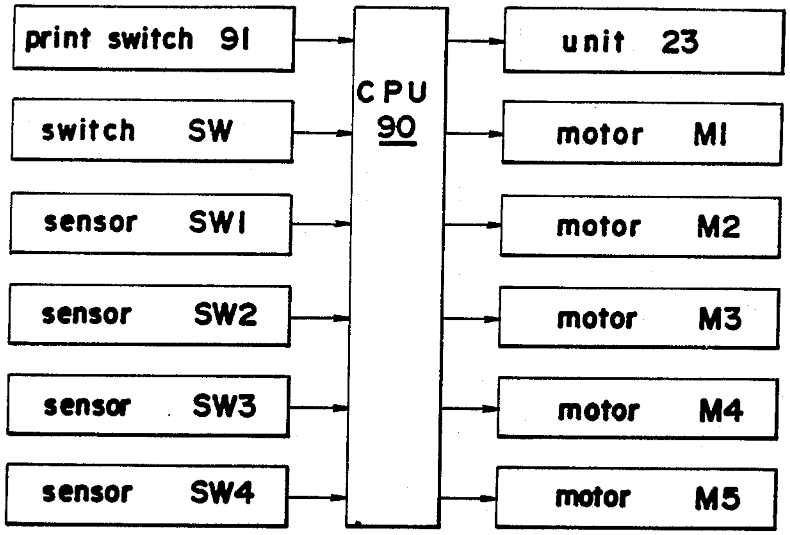
FIG. 4 is a block diagram of the control circuit of the sheet guide device of the present invention.

FIG. 4 shows the control circuit for operating the sheet guide device of the present invention. Central processing unit (CPU) 90 comprising a microcomputer or like device has connected thereto a print switch 91 which provides the instruction for the laser printer to start the printing operation. Switches SW1, SW2. SW3 and SW4 as well as the cutter initial switch SW are connected to CPU 90. Control signals are transmitted from CPU 90 to optical unit 23, as well as to take-up roller drive motor M1, transport roller drive motor M2, cutter drive motor M3, width regulating plate drive motor M4, and push lever drive motor M5.

Figure 5:
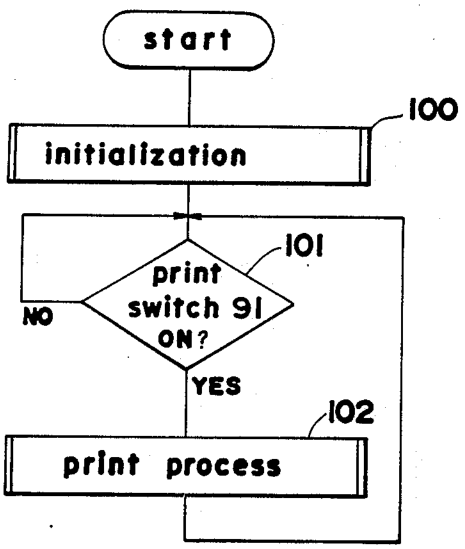
FIG. 5 is a flow chart showing the operation processing of the invention.

FIG. 5 is a flow chart showing the control sequence for the laser printer which incorporates the sheet guide device of when the laser printer is started it is initialized in step 100, print switch 91 is switched ON in step 101, and the print process routine is executed in step 102.

Figure 6:
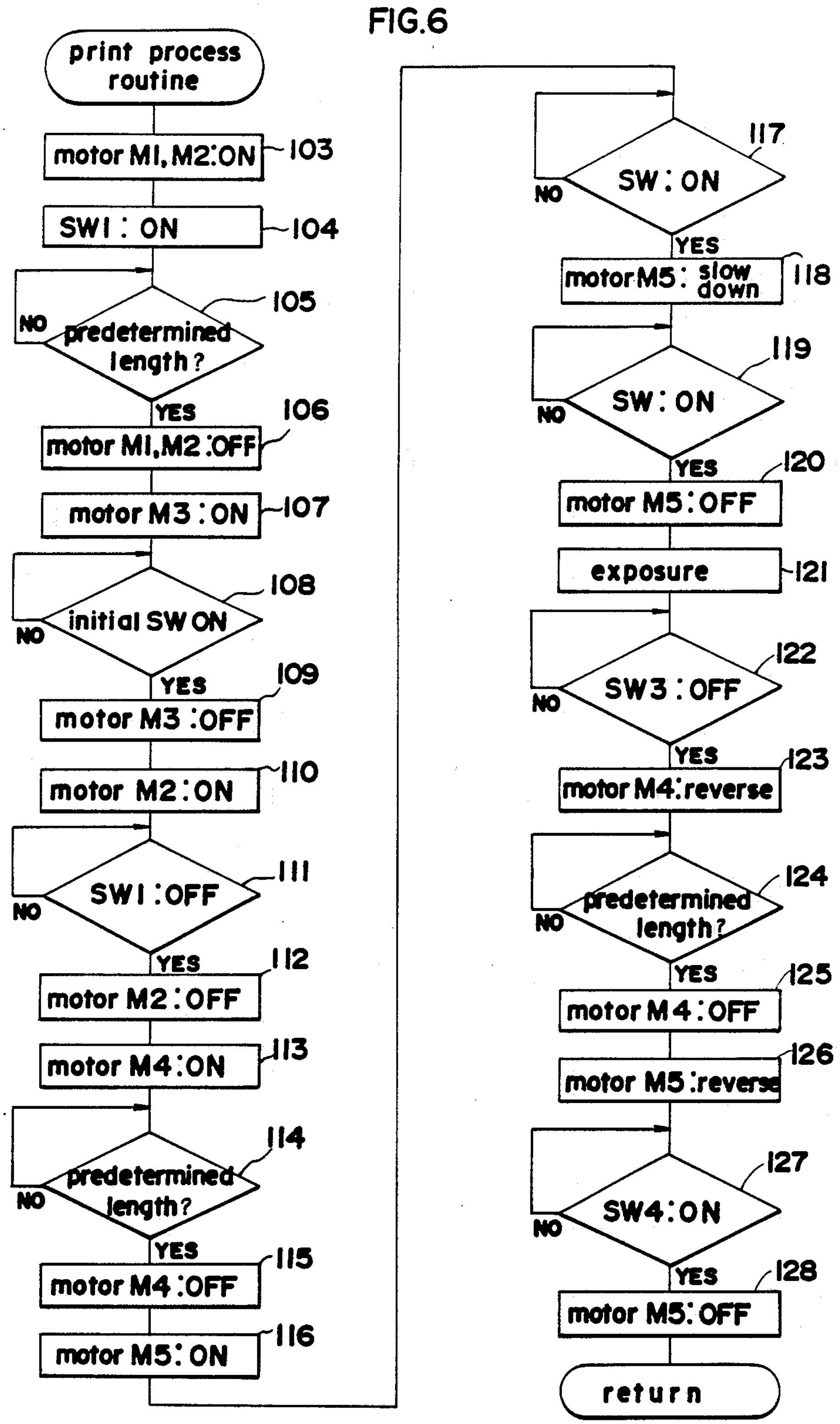
FIG. 6 is a flow chart showing details of the subroutines of the print processing shown in FIG. 5.

FIG. 6 is a flow chart showing details of the print process routine of step 102. At the start of the print operation, the leading edge of the rolled recording media stored in magazine 21 is gripped by take-up rollers 26. When print switch 91 is switched ON, the take-up roller drive motor M1 and transport roller drive motor M2 are switched ON, as shown in step 103. When the leading edge of the recording medium then arrives at the sensor SW1 position it is detected in step 104. In step 105, the length of the transported medium is detected and then, in step 106, motors M1 and M2 are stopped. The length of the recording medium is measured, for example, by detecting the number of rotations of motor M1 by counting the number of pulses transmitted therefrom. The length of the transported media may also be detected by measuring the time period after sensor SW1 is switched ON.

In step 106 motors M1 and M2 are stopped and in step 107 cutter drive motor M3 is actuated to cut the rolled media into a sheet of specified length. Completion of the media cutting operation by the cutter is determined by initial switch SW in step 108, and in step 109 the cutter drive motor M3 is stopped. In step 110, transport roller drive motor M2 is restarted and sheet R is advanced into transport path 32 by transport rollers 27.

Sheet R is advanced by transport rollers 27 and when the trailing edge arrives at the sensor SW1 position, said sensor SW1 detects the trailing edge of said sheet R in step 111, and transport roller drive motor M2 is stopped in step 112. Then, in step 113, width regulating plate drive motor M4 is started and the two width regulating plates 76 and 77 are moved to mutual proximity. The width of the recording medium in magazine 21 is predetermined; when width regulating plates 76 and 77 have been advanced to the predetermined width and said advancement is detected in step 114, then the width regulating plate drive motor M4 is stopped in step 115.

Thus, sheet R is transported to the secondary scanning portion with high precision and without correcting the positional relationship between magazine 21 and the secondary scanning portion because sheet R is positioned widthwise in transport path 32.

The sheet is positioned at a specific location in transport path 32, as previously described, and push lever drive motor M5 is started in step 116. Push lever 34 therefore starts counterclockwise rotation from the state described in FIG. 2, and the sheet is advanced in transport path 32. Push lever drive motor M5 may also be started simultaneously with the start of width regulating plate drive motor M4.

When it is determined that sensor SW2 is ON in step 117, the advance of the leading edge of sheet R to such position is detected, and the sheet transport speed produced by push lever drive motor M5 is reduced in step 118 to less than that produced by transport rollers 37 of the secondary scanning portion. Thus, sheet R is transported at high speed until the leading edge of said sheet arrives at the sensor SW2 position, but image irregularities arising from gripping the media are prevented by reducing the speed of the sheet advance prior to the leading edge arriving at the secondary scanning portion.

The advance of sheet R in transport path 32 is accomplished smoothly and reliably and without sheet R binding on guide panels 30 and 3 because said arc-shaped guide panels are curved in the same direction as the likely curl of sheet R. Each time sheet R is positioned by width regulating plates 76 and 77, said sheet R is positioned so as to have sufficient stiffness in the width direction due to the curled condition induced in said sheet. Thus, sheet R is reliably aligned in the width direction without bending or misalignment each time said sheet is positioned.

When sheet R is detected by sensor SW3 (step 119) as the leading edge is gripped by transport rollers 37 of the secondary scanning portion, said sheet R is advanced by said transport rollers 37, push lever drive motor M5 is stopped in step 120, and said sheet R is exposed to a laser beam generated by optical unit 23 in step 121. Only transport rollers 37 are actuated during exposure.

After exposure, sensor SW3 OFF status is detected in step 122, width regulating plate drive motor M4 is reversed in step 123 with the completion of said exposure, and width regulating plates 76 and 77 mutually move so as to separate in preparation for the advance of subsequent sheets. The separation stroke is identical to the prior tightening stroke. The separation movement is detection in step 124, and the regulating plate drive motor M4 is stopped in step 125. Then push lever drive motor M5 is reversed in step 126. Motor M5 may be reversed simultaneously with the reversal of regulating plate drive motor M4. When the return of push lever 34 to the starting position is detected by sensor SW4 in step 127, push lever drive motor M5 is stopped in step 128 in preparation for the advancement of subsequent sheets. The image forming operation is thus completed for a single sheet R.

After sheet R having an image formed thereon is transported to the switchback space 41 shown in FIG. 1, it is advanced through transport path 48 to developing unit 24.

Figure 7:
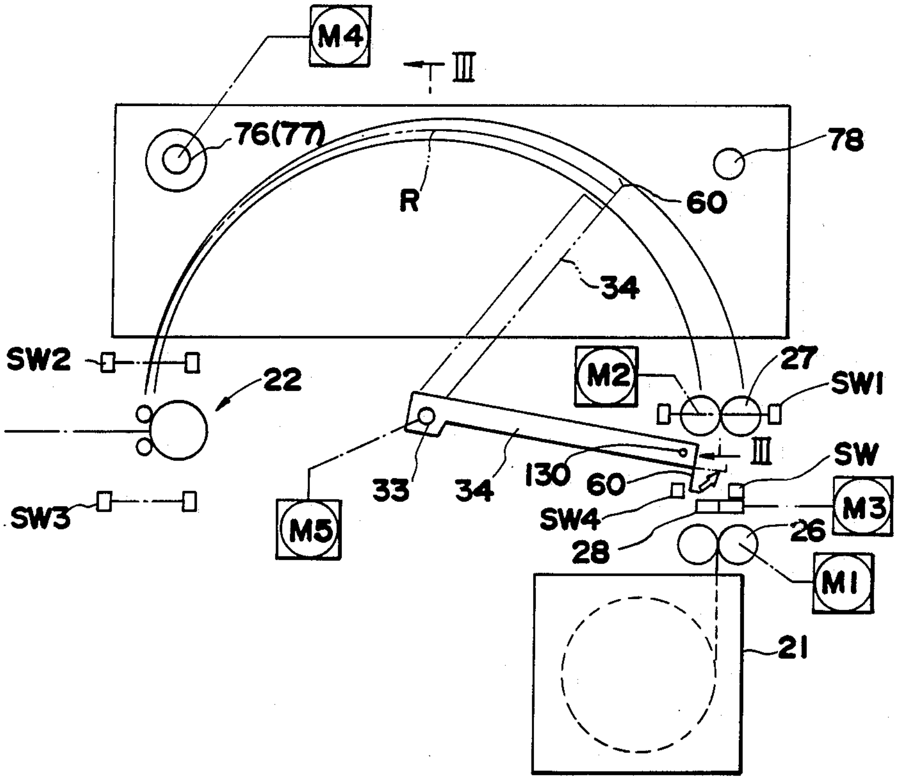
FIG. 7 shows an enlarged cross section view of another embodiment of the sheet guide device of the present invention.

FIG. 7 shows a second embodiment of the present invention. In this embodiment, hook 60 is rotatable about a shaft 130, but all other features are identical to those of the first embodiment and a description of each component is herein omitted.

In the present embodiment, when sheet R is ensnared by hook 60, said hook 60 is pushed to the position indicated by the two-dot chain line in FIG. 7, i.e., hook 60 is pushed in the arrow direction in the drawing. Sheet R therefore is advanced medially to rollers 26 and 27, and the amount of travel necessary to move push lever 34 without hampering said advance is less than that of the first embodiment.

The operation of each component in the second embodiment is identical to that of described in FIGS. 4 through 6 and further explanation is omitted.

Although not shown in the drawings, hook 60 may be mounted so as to be slidable in the length direction of push lever 34 to minimize the amount of movement of said push lever 34.

In the aforesaid embodiments of the invention the sheet media are transported to the image forming portion after reliable alignment in a specified position in the transport path by means of width regulating plates 76 and 77.

Figure 8:
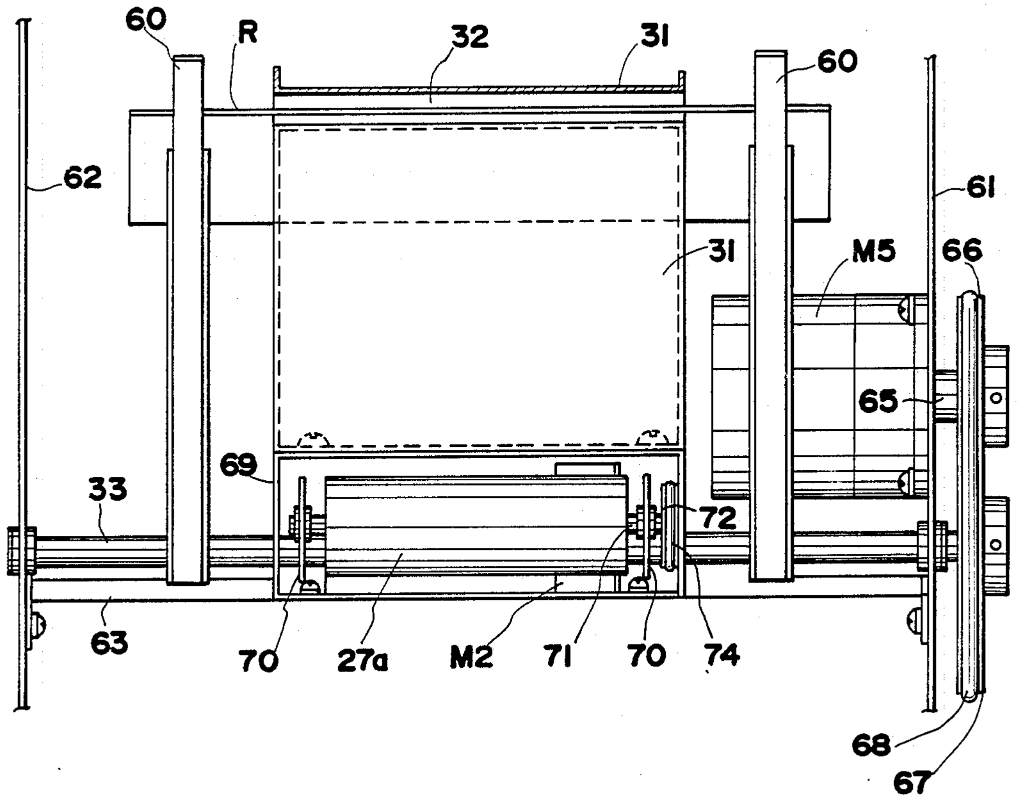
FIG. 8 is a cross section view of still another embodiment of the sheet guide device of the invention.

However in the present invention, width regulating plates 76 and 77 are not necessarily required and the sheet media can be transported with precision in a configuration which lacks said width regulating plates 76 and 77 as shown, for example, in FIG. 8. Each component in FIG. 8 is identical to that shown in FIGS. 1 through 3 and further explanation is omitted. FIG. 8 is corresponds to the cross section view of line III—III in FIG. 2. Further, the operation of said embodiment is identical to that described in FIGS. 4 through 6 and additional explanation is omitted herein.

In the above described embodiments of the invention guide panel 31 is arc-shaped with a uniform radius of curvature having at its center rotatable shaft 33, but said guide panel may also be configured as an elliptical shape or a configuration having a linear portion. In such instances the tip of push lever 34 may be provided a sleeve member which makes slidable contact with the inner surface of guide 31 via an elastic force, said sleeve member having hook 60 mounted thereon. Hook 60 moves so as to conform with the configuration of transport path 32 in tandem with the rotation of push lever 34.

Although the present invention has been fully described by way of examples with reference to the accompanying drawings, it is to be noted that various changes and modifications will be apparent to those skilled in the art. Therefore, unless otherwise such changes and modifications depart form the scope of the present invention, they should be construed as being included therein.

What is claimed is:

1. A device for transporting recording media from a storing portion to an image forming portion comprising:
 - a storing member provided at the storing portion for storing the recording media having a photosensitive property in a roll form;
 - a take-up means for taking-up the leading end of the recording media from the storing member;
 - a cutting means for cutting the recording media take up by the take-up means to obtain a sheet medium having a specified length;
 - an exposing means provided at the image forming portion for exposing the sheet medium to forming an image thereon;

an arcshaped upper and lower panels arranged to opposite to each other to have a predetermined space therebetween, said space forming a arcshaped path for transporting the sheet medium, wherein said arcshaped upper and lower panels are positioned between the storing portion and the image forming portion and are arranged to have widths less than that of the sheet medium;

a pair of lever pivotaly mounted to a rotating shaft, said levers having at free end thereof hooks arranged to position at opposite sides of the arcshaped upper and lower panels in the widthwise direction;

a driving means for pivotaly moving the pair of levers about the rotating shaft with pushing a trailing end of the sheet medium by the hooks; and a pair of width regulating plates being movable supported so as to be apart from and approach to the opposite sides of the arcshaped upper and lower panels in a widthwise direction, wherein said pair of width regulating plates determine a specific positioning of the sheet medium in the widthwise direction when said sheet medium is in the arcshaped path.

2. A device for transporting recording media according to claim 1 wherein said hooks start to push the trailing end of the sheet medium after the width regulating plates determine the specific positioning of the sheet media.

3. A device for transporting recording media according to claim 1 wherein said hooks start to push the trailing end of the sheet medium at the same time the width regulating plates start to approach to the opposite sides of the upper and lower panels in the widthwise direction so s to determine the specific positioning of the sheet medium in the widthwise direction.

4. A device for transporting recording media according to claim 1 wherein the arcshaped upper and lower panels are arranged to curve in the same direction as curling direction of taken-up recording media.

5. A device for transporting recording media from a storing portion to an image forming portion comprising:

a storing member provided at the storing portion for storing the recording media having a photosensitive property in a roll form;

a take-up means for taking-up the leading end of the recording media from the storing member;

a cutting means for cutting the recording media taken up by the take-up means to obtain a sheet medium having a specified length;

an exposing means provided at the image forming portion for exposing the sheet medium to forming an image thereon;

an arcshaped upper and lower panels arranged to opposite to each other to have a predetermined space therebetween, said space forming a arcshaped path for transporting the sheet medium, wherein said arcshaped upper and lower panels are positioned between the storing portion and the image forming portion and are arranged to have widths less than that of the sheet medium and to curve in the same direction as curling direction of taken-up recording media;

a pair of levers pivotaly mounted to a rotating shaft, said levers having at free end thereof hooks arranged to position at opposite sides of the arcshaped upper and lower panels in the widthwise direction; and a driving means for pivotaly moving the pair of levers about the rotating shaft with pushing a trailing end of the sheet medium by the hooks.

6. A device for transporting recording media from a storing portion to an image forming portion comprising:

storing means provided at the storing portion for storing the recording media;

feeding means for feeding the recording media from the storing means;

arcshaped upper and lower members disposed opposite one another to have a predetermined space therebetween, said space forming an arcshaped path for transporting the recording media, wherein said upper and lower members are positioned between the storing portion and the image forming portion;

transporting means for transporting the recording media through the arcshaping path; and a width regulating member for regulating a position of the recording media, wherein the regulating member approaches the recording media from a direction perpendicular to the transporting direction of the recording media when the recording media is in the arcshaped path.

7. A device for transporting recording media from a storing portion to an image forming portion comprising:

storing means provided at the storing portion for storing the recording media;

feeding means for feeding the recording media from the storing means;

arcshaped upper and lower members disposed opposite one another to have a predetermined space therebetween, said space forming an arcshaped path for transporting the recording media, wherein said arcshaped upper and lower members are positioned between the storing portion and the image forming portion;

a lever pivotally mounted to a rotating shaft, said lever having a hook at a free end thereof;

driving means for pivotally moving the lever about the rotating shaft to push a trailing end of the recording media by the hook; and a width regulating member for regulating a position of the recording media, wherein the regulating member approaches the recording media from a direction perpendicular to the transporting direction of the recording media when the recording media is in the arcshaped path.

8. A device for transporting recording media according to claim 7, wherein the arcshaped upper and lower members are arranged to have widths less than that of the recording media.

9. A device for transporting recording media according to claim 8, wherein a hook is provided at each side of the arcshaped members in the direction of transport of the recording media.

10. A device for transporting recording media from a storing portion to an image forming portion comprising:

storing means provided at the storing portion for storing the recording media in a roll form;

take-up means for taking-up the leading end of the recording media from the storing means;

cutting means for cutting the recording media taken up by the take-up means to obtain a sheet medium having a specified length;

arcshaped upper and lower members disposed opposite to one another to have a predetermined space therebetween, said space forming an arcshaped path for transporting the sheet media, wherein said arcshaped upper and lower members are positioned between the storing portion and the image forming portion and are arranged to curve in the same direction as a curling direction of taken-up recording media;

a lever pivotally mounted to a rotating shaft, said lever having a hook at a free end thereof; and driving means for pivotally moving the lever about the rotating shaft to push a trailing end of the sheet medium by the hook.

11. A device for transporting recording media according to claim 10, wherein the arcshaped upper and lower members are arranged to have widths less than that of the recording media.

12. A device for transporting recording media according to claim 11, wherein a hook is provided at each side of the arcshaped members in the direction of transport of the recording media.

* * * * *